Patented Oct. 5, 1937

2,094,832

UNITED STATES PATENT OFFICE 2,094,832

COMPLEX METAL AZO COMPOUNDS

Hermann Winkeler, Ludwigshafen-on-the-Rhine, and Erich Fischer, Bad Soden in Taunus, Germany, assignors to General Aniline Works, Inc., New York, N. Y., a corporation of Delaware No Drawing. Original application January 21, 1935, Serial No. 2,796. Divided and this application November 23, 1935, Serial No. 51,274. In Germany January 31, 1934

8 Claims. (Cl. 260—12.2)

This invention relates to the production of complex metal compounds of new azo dyestuffs and a process of producing the same. The present application has been divided out from our copending application Ser. No. 2,796, filed January 21, 1935.

We have found that valuable azo dyestuffs capable of being converted in substance or on the fibers into complex compounds are obtained by coupling with coupling components diazo compounds of amines of the general formula:

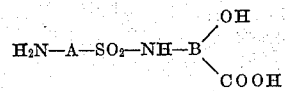

in which A stands for the radicle of an aromatic hydrocarbon which may also contain substituents selected from the group consisting of a halogen atom, the $NO_2$- and an -O-alkyl group, B stands for a hydrocarbon radicle of the benzene series containing the hydroxy group in 2-position with reference to the carboxylic group as in 1-position and which in the 5-position may contain a methyl group or a substituent selected from the group consisting of the halogen, -$NO_2$ and -$HSO_3$ group, the said hydrocarbon radicle of the benzene series being attached to the sulfonyl amide-grouping in the 3-position to the carboxylic group.

Suitable amines of the said kind are for example N-(3'-aminobenzene-sulfonyl)-3-amino-2-hydroxybenzene-1-carboxylic acid, N-(3'-aminobenzene-sulfonyl)-3-amino-2-hydroxy-5-sulfobenzene 1-carboxylic acid, N-(3'-amino-6'-methylbenzene-sulfonyl)-3-amino-2-hydroxy-5-sulfobenzene-1-carboxylic acid, N-(4'-amino-3'-chlorobenzene-sulfonyl)-3-amino-2-hydroxy-5-sulfobenzene-1-carboxylic acid, N-(3'-amino-4'-methoxybenzene-sulfonyl)-3-amino -2- hydroxy-5-sulfobenzene-1-carboxylic acid, N-(3'-aminobenzene-sulfonyl)-3-amino-2-hydroxy-5-nitrobenzene-1-carboxylic acid, N-(3'-amino-6'-methylbenzene-sulfonyl)-3-amino-2-hydroxy-5-methylbenzene-1-carboxylic acid.

The dyestuffs obtainable according to the invention from aminosulfonyl compounds of orthoaminosalicylic acids yield complex chromium compounds which have good properties as regards fastness to light, washing, fulling, rubbing and alkali. The dyestuffs themselves as well as their complex chromium compounds have a very good levelling power.

The following examples will further illustrate the nature of this invention but the invention is not restricted to these examples. The parts are by weight.

Example 1

388 parts of N-(3'-amino-benzene-sulfonyl)-3-amino-2-hydroxy-5-sulfo benzene-1-carboxylic acid are dissolved in 2000 parts of water with an addition of sodium carbonate and mixed with 69 parts of sodium nitrite. The whole is allowed to flow into diluted hydrochloric acid at room temperature. The separated white-gray diazo compound is then carried into an ice-cooled solution of 103 parts of 3-methyl-5-pyrazolone rendered alkaline with sodium bicarbonate. At the end of the coupling the dyestuff being already partly separated is totally salted out and filtered by suction. The dyestuff dyes wool very uniformly yellow shades with a tint of green which yields dyeings very fast to light, washing and fulling by aftertreatment with chromium salts. The complex chromium compound of the dyestuff obtained by treating the dyestuff in substance with agents supplying chromium has quite an excellent levelling power and yields on animal fibres dyeing of good fastness to light washing and fulling.

Using the diazo compound of N-(3'-amino-6'-methylbenzene-sulfonyl)-3-amino-2-hydroxy-5-sulfobenzene-1-carboxylic acid or N-(4'-amino-3'-chlorobenzene-sulfonyl)-3-amino-2-hydroxy-5-sulfobenzene-1-carboxylic acid instead of the above mentioned diazo compound, dyestuffs of similar properties are obtained. These diazo compounds when coupled with other pyrazolones than 3-methyl-5-pyrazolone, for example 1-phenyl-3-methyl-5-pyrazolone or 1-(2'-chlorophenyl)-3-methyl-5-pyrazolone, yield dyestuffs which dye more reddish shades of better fastness to washing and fulling than those obtained by coupling the said diazotized amines with 3-methyl-5-pyrazolone.

Example 2

322 parts of N-(3'-amino benzene-sulfonyl)-3-amino-2-hydroxy-5-methylbenzene-1-carboxylic acid are diazotized as described in Example 1 and the diazo compound is coupled with 1-(2'-chloro- 5'-sulfophenyl)-3-methyl-5-pyrazolone in a solution rendered alkaline with sodium carbonate. The dyestuff separated by salting out with common salt dyes wool shades which by after-treatment with agents supplying chromium yield brown-yellow dyeings of very good properties as regards fastness; the chromium complex compound of the dyestuff obtained by treating the dyestuff in substance with chromium salts dyes wool and silk very uniformly greenish-yellow shades of very good fastness to light and good fastness to washing and fulling.

Using N-(3'-amino-6'-methylbenzene-sulfonyl)-3-amino-2-hydroxy-5-methylbenzene-1-carboxylic acid for the diazo compound dyestuffs of similar properties are obtained. By coupling the said diazo compounds with sulfonated pyrazolones free from halogen the azo dyestuffs obtained dye somewhat more reddish shades.

*Example 3*

388 parts of N-(3'-aminobenzene-sulfonyl)-3-amino-2-hydroxy-5-sulfobenzene-1-carboxylic acid are diazotized as described in Example 1 and coupled with 2.4-dihydroxy-quinoline in a solution rendered alkaline with sodium carbonate. The dyestuff obtained yields on wool and silk, either by after-treatment the dyeing on the fibre with agents supplying chromium or by dyeing with the complex chromium compound of the dyestuff, yellow shades of good fastness. By coupling the said diazo compound with beta-naphthol or beta-naphthol-sulfonic acids dyestuffs are obtained which dye orange to red shades. When using resorcinol as coupling compound, a dyestuff is obtained which dyes leather yellow-brown shades having a very good fastness to light.

*Example 4*

308 parts of N-(3'-amino-benzenesulfonyl)-3-amino-2-hydroxy benzene-1-carboxylic acid are diazotized as described in Example 1 and mixed with a solution of 310 parts of 1-(2'-chlor-5'-sulpho-phenyl)-3-methyl-5-pyrazolone rendered alkaline with sodium bicarbonate. The dyestuff is isolated by salting out and dyes wool yellow shades. By after-treatment with chromium salts yellow dyeings of good fastness to washing and fulling are obtained. The chromium compound obtained by chroming the dyestuff itself dyes wool and silk very uniformly yellow shades of good fastness to washing and fulling.

What we claim is:

1. Complex metal compounds of azo dyestuffs corresponding to the general formula

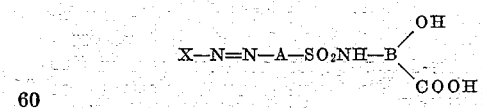

in which A stands for a radicle selected from the group consisting of aromatic hydrocarbons, halogenated aromatic hydrocarbons, nitrated aromatic hydrocarbons and alkoxy substituted aromatic hydrocarbons, B stands for a hydrocarbon radicle of the benzene series containing the hydroxy group in the 2-position with reference to the carboxylic group in the 1-position and which contains in the 5-position a member of the group consisting of hydrogen, methyl, halogen, the NO$_2$- and-SO$_3$H group, the said hydrocarbon radicle of the benzene series being attached to the sulfonyl-amide grouping in the 3-position with reference to the carboxylic acid group, and wherein X represents a coupling component selected from the group consisting of pyrazolones, hydroxy-quinolines and phenols.

2. Complex chromium compounds of azo dyestuffs corresponding to the general formula

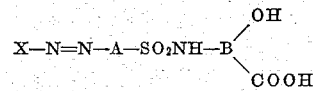

in which A stands for a radicle selected from the group consisting of aromatic hydrocarbons, halogenated aromatic hydrocarbons, nitrated aromatic hydrocarbons and alkoxy substituted aromatic hydrocarbons, B stands for a hydrocarbon radicle of the benzene series containing the hydroxy group in the 2-position with reference to the carboxylic group in the 1-position and which contains in the 5-position a member of the group consisting of hydrogen, methyl, halogen, the NO$_2$- and-SO$_3$H group, the said hydrocarbon radicle of the benzene series being attached to the sulfonyl-amide grouping in the 3-position with reference to the carboxylic acid group, and wherein X represents a coupling component selected from the group consisting of pyrazolones, hydroxy-quinolines and phenols.

3. Complex metal compounds of an azo dyestuff corresponding to the formula:

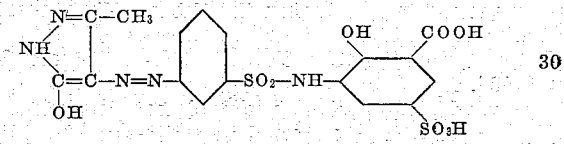

4. Complex chromium compound of an azo dyestuff corresponding to the formula:

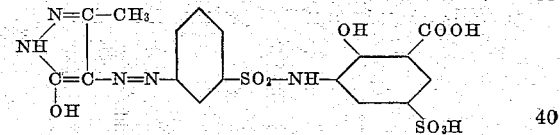

5. Complex metal compounds of an azo dyestuff corresponding to the formula:

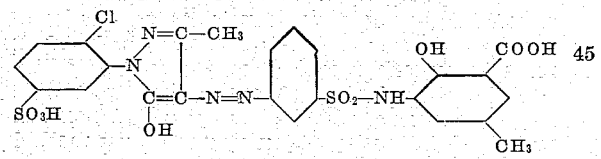

6. Complex chromium compound of an azo dyestuff corresponding to the formula:

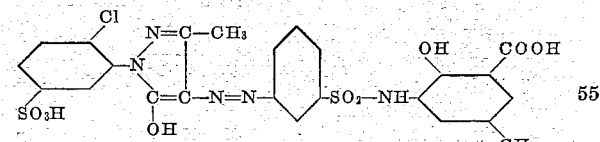

7. Complex metal compounds of an azo dyestuff corresponding to the formula:

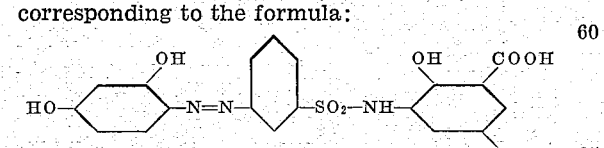

8. Complex chromium compound of an azo dyestuff corresponding to the formula:

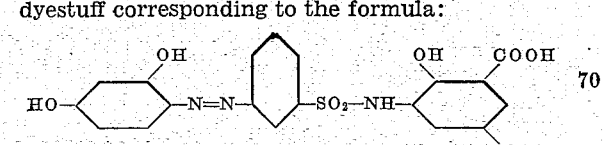

HERMANN WINKELER.
ERICH FISCHER.